T. M. LUNAN & A. C. RANTSCH.
METALLIC SHINGLE AND THE METHOD OF MAKING THE SAME.
APPLICATION FILED DEC. 1, 1908.
942,577. Patented Dec. 7, 1909.
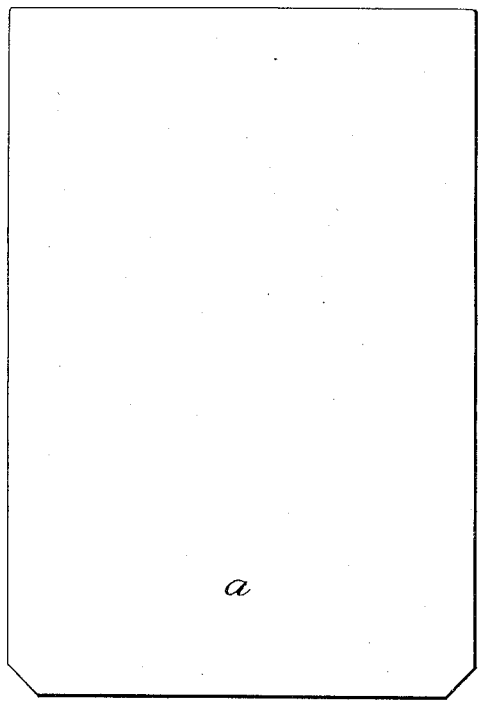
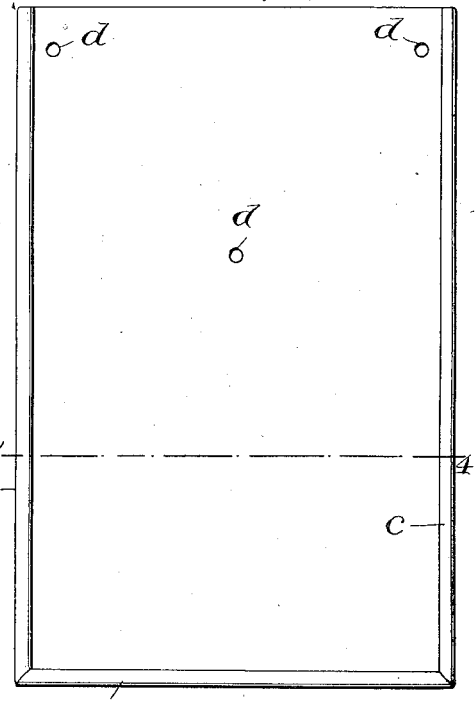
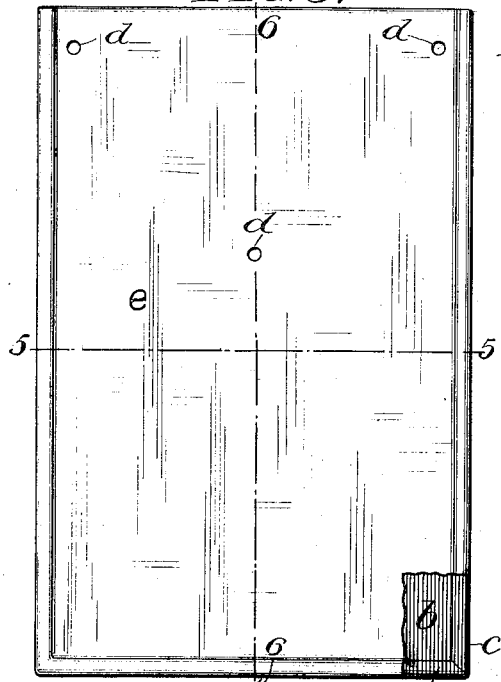
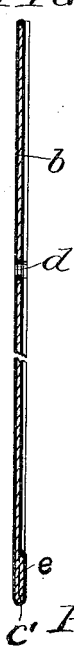
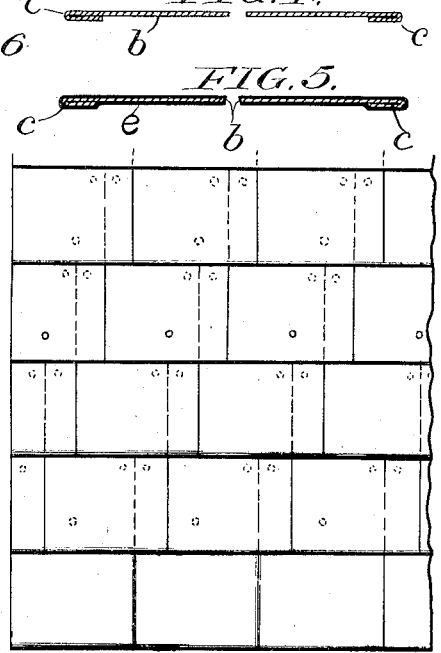

UNITED STATES PATENT OFFICE.

THOMAS M. LUNAN, OF BUFFALO, AND ALFRED C. RANTSCH, OF NEW YORK, N. Y.

METALLIC SHINGLE AND THE METHOD OF MAKING THE SAME.

942,577.

Specification of Letters Patent.   Patented Dec. 7, 1909.

Application filed December 1, 1908. Serial No. 465,535.

*To all whom it may concern:*

Be it known that we, THOMAS M. LUNAN and ALFRED C. RANTSCH, both citizens of the United States of America, residing, respectively, at Buffalo, Erie county, State of New York, and at New York, borough of Brooklyn, State of New York, have invented certain new and useful Improvements in Metallic Shingles and the Method of Making the Same, of which the following is a specification.

So called enameled metallic shingles are known which, however, are coated with paint baked on, and also metallic roofing material in general is known which is coated on one or both sides with some vitreous substance, but such known articles do not meet the objects of our present invention.

Our invention relates to shingles for roofing or for the sides of a building and to the method of making the same, and has in view a number of objects which will appear herein.

The invention consists in the main of an improved shingle composed of sheet metal, such as steel or iron, and covered with an impervious coat of glass fused onto the metal at high heat, and the invention consists further in certain details in the shingle and method of making the same which will be hereinafter described and then pointed out in the claims.

In the accompanying drawings illustrating a suitable form of our invention,—Figure 1 is an elevation of a metallic shingle blank. Fig. 2 is an elevation of an uncoated perforated metallic shingle with reinforced edges, in accordance with our invention. Fig. 3 is an underside elevation of our glass coated metallic shingle, a part of the coating being broken away. Fig. 4 is a transverse section on line 4—4, Fig. 2. Fig. 5 is a transverse section on line 5—5, Fig. 3. Fig. 6 is a longitudinal section on line 6—6, Fig. 3, and Fig. 7 represents a series of the shingles in use.

In carrying out our invention, we first prepare a glass of approximately and preferably the following composition: feldspar 140 parts; quartz 40 parts; borax 100 parts; soda ash 40 parts; fluorspar 3 parts; saltpeter 5 parts; manganese oxid 2 parts; and cobalt oxid 2 parts. These substances are first intimately mixed, and are then put in a smelting furance and liquefied at a temperature of approximately 2800 degrees Fahrenheit. This glass thus formed is drawn off in water, and then ground, with clay and water, to a paste of proper consistency in a suitable grinding mill. The glass is now ready to be applied.

The shingle and method of making it will now be described. A metallic blank *a*, Fig. 1, which may have the general shape shown of the ordinary wooden or slate shingle, or any suitable shape or dimensions for a plate *b*, Fig. 2, has its opposite edges so curled over or hemmed from end to end as shown at *c* that there are no projecting edges or flanges, and one or both end edges may be likewise turned as shown at *c'*, thus providing the plate with rounded or reinforced edges. The metal used is preferably sheet iron or steel. Either before or after the edges *c* are turned over or rounded, or simultaneously, the plate to form the shingle is provided with means permitting the fastening of the shingle in place, which in the preferred form of the invention consist of nail holes or perforations *d* made in one end of the plate *b*, between the reinforced edges *c*, preferably in such position that the lap of the next shingle will cover the nails. The so reinforced plate *b* is now ready to be treated for receiving its coat of enamel.

After the plate *b* has been properly shaped, we first anneal it to soften it and remove the grease (which step we may at times dispense with), then pickle in a bath of muriatic, sulfuric or other acids, until we get a properly etched surface. When this state is reached, we rinse the article in pure water, and finally immerse it in boiling soda water, or potash water, or lime water, to remove the last trace of acid. The shaped plate *b* is now ready to receive the glass, and is dipped in the paste previously described and shaken off smooth and even, so that all surfaces are coated with a suitable thick coat. It is then carried into a drying oven and dried at a temperature of about 130 degrees F. When dry it is removed and put in an enameling muffle, where the glass is melted and fused firmly onto the metal plate at a temperature of over 2000 degrees F. to provide an impervious coating *e* all over the plate, and a shingle is produced such as shown in Figs. 3, 5 and 6. Glass thus applied does not adhere well on sharp edges, and hence our shingle is preferably hemmed or curled in slightly on the edges as shown, thus presenting a rounded edge surface for the glass adhesion, and giving the finished product an entirely glass coated surface, which is thoroughly rust-proof, fire-proof, requires no painting, and is of indefinite life. The importance of this rounding or hemming will be readily understood. If we consider the manufacture of a pure white shingle (for these shingles will be made of any color, blue, black, green, red, etc.), it will be seen that without this hemming or the like, the metal would usually be exposed at the edges and the edges would rust, and a rust stain trail clear across the roof would be the result, leaving it unsightly and in time destroying the coating. The reinforcement of the edges of the shingle also so stiffens them that resistance to bending is provided so that the glass coating at the edges cannot be cracked off. The rounding up of the edges, however, is the main factor for the reasons given. As the perforating of the shingle is performed before the glass is applied, the walls of the holes or perforations will also be coated with it.

In substance and effect the improved shingle is of glass with a shaped filling or core of metal for giving necessary strength to the glass.

A roof covered with our shingles presents a highly glazed,—or dull if desired,—finish; and will be moisture or water-proof, fire-proof, rust-proof, will be uninfluenced by atmospheric conditions, and will last indefinitely. No painting is required, and it can be cleaned at any time by means of water. Our shingle possesses the qualities of tough glass reinforced by metal and is therefore practically unbreakable.

Having thus described our preferred form of the invention, what we desire to and do claim as new is,—

1. As a new article of manufacture, a sheet metal shingle having a coating of glass, for substantially the purposes set forth.

2. As a new article of manufacture, a glass-coated metal shingle having rounded edges, the said coating being also upon said edges, for substantially the purposes set forth.

3. As a new article of manufacture, a glass-coated metal shingle having hemmed or curled edges, the said coating being also upon said edges, for substantially the purposes set forth.

4. As a new article of manufacture, a glass-coated metal shingle having reinforced edges, the said coating being also upon said edges, for substantially the purposes set forth.

5. As a new article of manufacture, a glass-coated shingle having means providing for suitable fastenings, for substantially the purposes set forth.

6. As a new article of manufacture, a glass-coated shingle having nail-holes or perforations, the said coating being also upon the walls of said holes, for substantially the purposes set forth.

7. As a new article of manufacture, a glass-coated shingle having rounded edges, and provided between such edges with nail-holes or perforations, the coating being both upon said edges and upon the walls of said holes, for substantially the purposes set forth.

8. As a new article of manufacture, a metallic shingle free from any projecting sharp edges or flanges, and which is enveloped entirely in a suitable glass coating, for substantially the purposes set forth.

9. The herein described method of making shingles, which consists in rounding the edges of a metallic shingle-blank, and then coating the entire surface and edges with glass, for substantially the purposes set forth.

10. The herein described method of making shingles, which consists in suitably rounding and reinforcing the opposite edges of a metallic shingle-blank, and then coating all exposed surfaces with glass, for substantially the purposes set forth.

THOMAS M. LUNAN.
ALFRED C. RANTSCH.

Witnesses:
ROBERT ROTHENY,
HARVEY HOFFMANN.